May 22, 1934.     T. W. GREENE     1,960,105
LINER FOR WELDED PIPE JOINTS
Filed Feb. 12, 1931     2 Sheets-Sheet 1
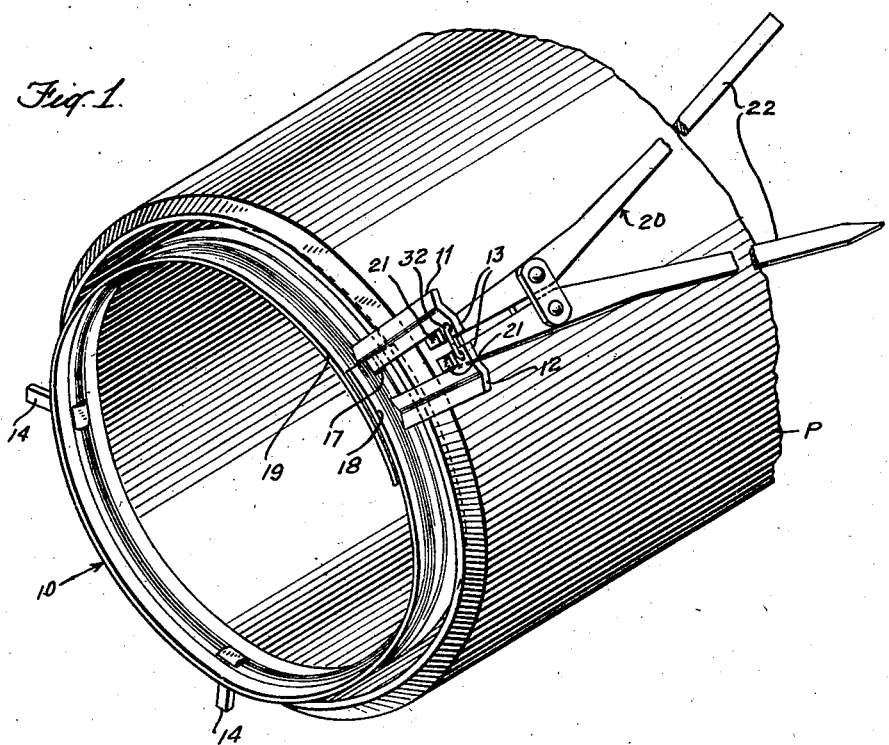
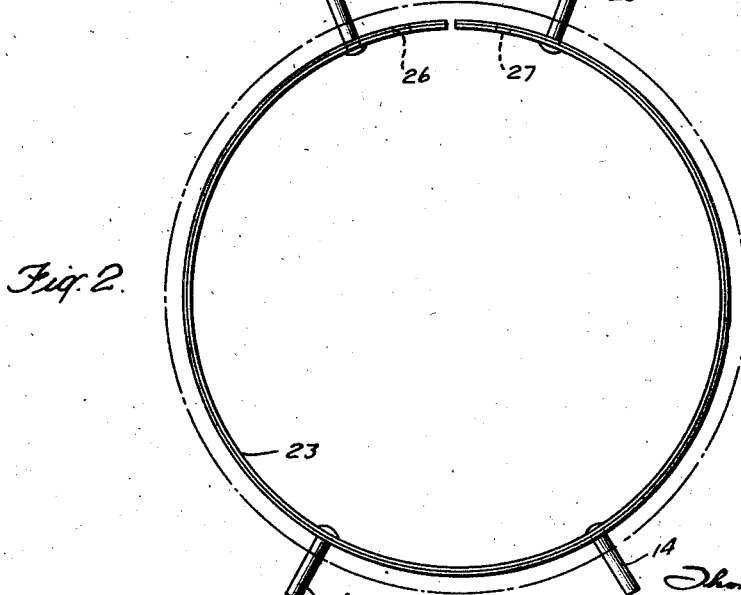
INVENTOR:
Thomas W. Greene,
BY Byrnes Townsend & Potter,
ATTORNEYS.

May 22, 1934.   T. W. GREENE   1,960,105
LINER FOR WELDED PIPE JOINTS
Filed Feb. 12, 1931   2 Sheets-Sheet 2
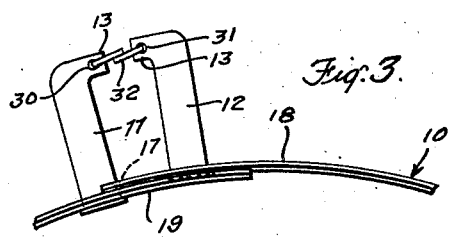
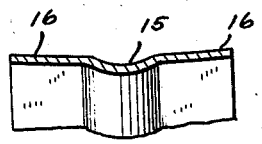
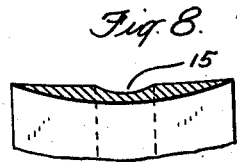
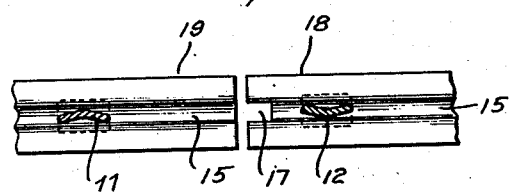
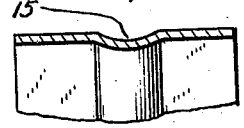
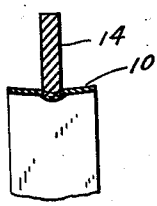
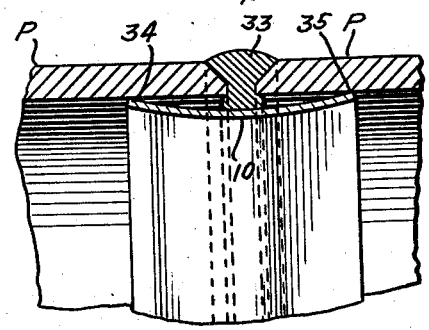
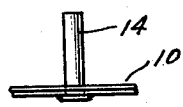
INVENTOR:
Thomas W. Greene,
BY
ATTORNEYS.

Patented May 22, 1934

1,960,105

UNITED STATES PATENT OFFICE 1,960,105

LINER FOR WELDED PIPE JOINTS

Thomas W. Greene, New York, N. Y., assignor to The Linde Air Products Company, a corporation of Ohio Application February 12, 1931, Serial No. 515,344

16 Claims. (Cl. 285—111)

This invention pertains in general to autogenous welding as employed to join the abutting ends of metal pipe sections, and in particular to a liner adapted for being expanded against the inner surface of said ends over the joint therebetween for the purpose of holding the ends in alignment and slightly separated so that they are in a substantially uniformly spaced relation suitable for welding, and also for the purpose of covering the inside of the joint so that it will offer less resistance to the flow of fluid through the pipe.

This invention is an improvement upon my welded pipe joint covered by my earlier patent application filed March 21, 1930, bearing Serial Number 437,903. The liner shown in my earlier application comprises a split ring of sheet metal having a plurality of threaded studs projecting outward from spaced points along the center. In assembling this liner to the abutting ends of two pipe sections the ring is placed inside the pipe so that the studs extend outward through the joint and a nut and washer are placed on each to expand the ring against the inner surface of the abutting ends over the joint. When expanded into position the studs extend outward through the joint and hold the abutting ends slightly separated in position for welding. I have found that the time required to expand this liner by means of the threaded studs with their attendant nuts and washers is so long it is objectionable. Therefore, one of the objects of this invention is to provide means for expanding such liners more quickly.

I have also found that under some conditions of alignment my earlier liner did not fit snugly against the inner surface of the pipe and consequently offered some resistance to fluid flow and the passage of cleaning devices. Therefore, another object of this invention is to improve the cross sectional form of this liner so that it will present a more even, smooth, and Venturi shape, that will offer less resistance to the passage of fluid.

Due to the flexibility of my liners difficulty has been encountered in holding them in a contracted condition during shipment and also during the operation of inserting them into the pipe joints when they are prepared for welding. Therefore, another object of this invention is to provide means for holding the ends of the contracted liners in alignment during shipment and during the operation of inserting them in the pipe joints.

Still other aims, objects, and novel features will be apparent from the specification and the accompanying drawings in which:

Fig. 1 is a reduced perspective showing my expanding tool in position to expand one form of my liner in a pipe joint;

Fig. 2 is a reduced side view of another form of my improved liner;

Fig. 3 is a larger side view of the ends of the liner shown in Fig. 1;

Fig. 4 is an enlarged top view in section of the ends of the liner;

Fig. 5 is a sectional view of one form of spacing stud riveted to the liner;

Fig. 6 is a side view of another form of spacing stud welded to the liner;

Figs. 7 to 10 are sectional views of various forms of my improved liner; and

Fig. 11 is a sectional view of one form of my pipe joint after welding.

The preferred form of my invention comprises a split ring 10 of metal such as sheet or cold rolled iron or steel adapted for being expanded against the inner surface of two pipe ends P over the joint therebetween when preparing the ends for the operation of being joined by autogenous welding.

For the purpose of expanding the liner I provide it with lugs 11 and 12 respectively attached near the ends of the liner at or near the center line thereof so that they extend outward through the pipe joint far enough to be engaged by an expanding tool that will be described presently. Each lug is provided with a projection 13 that extends from the outer end thereof toward the other lug for the purpose of holding the expanding tool in place so that it will not slip off the expanding lugs during the expanding operation.

The lugs 11 and 12 may be attached to the liner by any suitable means such as a riveted end or a weld. The thickness of the lugs is substantially the same as the separation desired between the ends of the pipe. The width of the lugs is sufficient to give them strength to expand the liner, and the length or height is sufficient to allow them to be engaged by the expanding tool outside of the pipe.

In order to hold the liner over the inside of the pipe joint, and also to hold the ends of the pipe separated so that they may be welded, the liner is provided with a plurality of studs 14 extending outward through the joint from spaced points along the center line of the liner. Like the lugs these studs may be attached to the liner by any suitable means such as a riveted end or a weld. These studs are long enough to extend outward through the pipe joint when the liner is in the pipe in a contracted condition, and their thickness or diameter is substantially the same as the separation required between the ends of the pipe sections, although in practice they are slightly smaller in thickness or diameter than the thickness of the lugs so that they will not be bound or gripped by the ends of the pipe and prevent the liner from being readily expanded. For the sake of economy both the lugs and the studs may be made from the same sheet of metal and then the lugs may be given an added thickness by bending them transversely as shown in Fig. 4.

The width of the liner 10 is sufficient to cover the joint in the pipe and also overlap the ends sufficiently to move them into alignment and support them both during and after the welding operation. Either the thickness or the width of the liner may be varied according to the size and weight of the pipe, and also according to variations in conditions under which the pipe is assembled and aligned.

For example, when used with standard 10 inch pipe, I prefer a liner about 1¼" wide; $\frac{1}{16}$" thick; and about 32" long. When formed into a ring it has a diameter slightly smaller than the inside diameter of the pipe. This liner is provided with two identical expanding lugs ⅝" wide; ¼" thick; and 2½" long. One lug is located about 2¼" from one end of the liner, and the other lug is located about 1" from the other end. The lugs are located so the projections 13 point toward the split in the liner and toward each other. The thickness or diameter of the spacer studs 14 is about $\frac{3}{32}$". Two of these spacers are employed and they are located about 10" apart and about the same distance from the expanding lugs 11 and 12. For larger sized pipe I use a larger number of studs but the exact number is not vital and may be varied to meet different conditions.

The cross sectional form of the liner 10 may be straight, as shown in my earlier application, but I prefer a liner having a depression at the center as shown in Figs. 7 to 10. This depression increases the strength of the liner; provides additional room for weld metal; causes the liner to fit the inside of the pipe more snugly; and offers less resistance to the flow of fluids through the finished pipe. The various shapes shown are adapted for different service conditions and joint requirements.

The shape shown in Fig. 10 has straight lateral portions with an outwardly facing concave depression 15 in the center and it is adapted for use under average conditions. The depression 15 may be varied in width and depth according to the amount of room required for weld metal but I have found that a width between ⅛" and ½" gives good results, and when used with 10" pipe a depth of $\frac{1}{16}$" is satisfactory.

The liner shown in Fig. 7 is similar to that shown in Fig. 10 with the exception that the lateral portions 16 are curved outward slightly so that the edges thereof hug the inside of the pipe more closely, especially when the pipe line is curved so that the abutting ends of the pipe sections come together at a slight angle.

The outer surface of the liner shown in Fig. 8 is similar to that shown in Fig. 7, but the inner surface is curved inward from side to side so that it forms a smooth restriction in the pipe that offers little resistance to the passage of fluids and cleaning devices that are sent through pipe lines to remove obstructions, especially pipe lines used for conveying oil.

The liner shown in Fig. 9 is similar in size to those preceding but it is curved inward from side to side.

One important function of all forms of my improved liner is to provide a restriction at each pipe joint that has a smooth inner surface of a form approaching that of the restriction in a Venturi meter so that the resistance to the flow of fluids through the completed pipe is of a very low value, in many cases less than that of pipes having joints formed without the use of a liner.

In order to facilitate the assembly of the liner in the pipe ends when the joint therebetween is prepared for welding, the liner is contracted to a size somewhat smaller than the inner diameter of the pipe, and a recess or slot 17 is provided in the end 18 of the liner, having its associated lug 12 the nearer thereto, so that when the liner is in contracted condition the end 18 is outside the opposite end 19, and the lug 11 is in the slot 17 thereby holding the ends of the liner in alignment so it may be inserted in the pipe joint without difficulty. For convenience in shipping and to prevent damage to the liners they are shipped in contracted condition and the ends thereof are provided with respective openings or holes 30 and 31 near the opposed ends of the inturned projections 13, and a piece of soft wire of iron or other suitable material is threaded through these holes and then bent over to form a link 32 that is sufficiently strong to hold the ends of the liner together during shipment. This link may be left in place when the liner is inserted in a pipe joint, and when the liner is expanded the link need not be removed but, instead, is simply straightened out by the expanding operation. The ends of the liner may be held together by other means such as by winding a wire around the lugs but this is less desirable because it interferes with getting the expanding tool in place, and then the wire must be removed before the liner can be expanded.

My improved liner is expanded by means of an expanding tool 20 similar to a pair of tongs that are hinged like a glove stretcher. After the liner has been placed in the pipe ends and the pipe sections have been moved together until the ends strike the lugs 11 and 12 or the studs 14, the handles 22 of the expanding tool are separated and the ends 21 are inserted between the expanding studs 11 and 12. Then the handles 22 are brought together thereby separating the expanding studs and expanding the liner against the inner surface of the pipe with sufficient force to move the pipe ends into axial alignment and also force the lateral portions of the liner into intimate contact with the respective pipe ends so that they are supported in alignment in position for welding.

Under some conditions it is desirable to use a liner in the form of a continuous ring that is not split and in such cases the split in my liner may be eliminated. When this continuous ring is used the novel features of my liner will produce the same desirable results as when used in the form of a split ring. When this solid liner is inserted in a pipe joint it snugly fits the inside of the pipe without being expanded, and the studs hold it in place while the joint is being welded.

The opposed ends of the pipe sections may or may not be beveled according to the requirements of each particular pipe line or joint. Also, after the ends are in position for welding, they may be "tacked" together and to the liner at various points before the main weld is started, or the main weld may be made without "tacking". As the main weld progresses each stud or lug is melted off as it is encountered and the portion remaining is fused into the weld so that when the weld is completed no portion of either a stud or lug is visible from the outside of the pipe.

An important feature of my improved liner is its characteristic of snugly fitting the inside of the pipe with considerable pressure, thereby offering less resistance to the flow of fluid through the pipe, better support for the ends of the pipe sections, and less opportunity for foreign matter to get between the liner and the pipe. This snug fit between the liner and the pipe results partially from the fit of the liner in the pipe before the joint is welded, and partially from the contraction of the weld metal when it cools. As shown in Fig. 11 the liner is curved laterally so that only the edges 34 and 35 are in contact with the inner surface of the pipe P. As the weld is made the molten weld metal 33 is fused to both the liner 10 and the ends of the pipe P. When this weld metal cools it contracts and draws the liner still tighter against the inner surface of the pipe. Thus produces a solid joint offering a minimum of resistance to fluid flow.

When the liner is being manufactured both the lugs 11 and 12 and the studs 14 may be riveted to the liner in any well known manner thereby forming a joint such as that shown in Fig. 5, or they may be welded to the liner so that a joint is formed like the one shown in Fig. 6. They may also be welded to the liner without any portion of either projecting inside the liner. However, the specific means of attaching them forms no part of the invention and, therefore, other means may be used where desirable.

A modified form of my improved liner is shown in Fig. 2 in which studs 24 and 25 are inserted near the ends of a liner 23 in place of the lugs 11 and 12 for the purpose of holding the pipe ends in a separated condition, and two openings 26 and 27 are respectively provided in the ends for the purpose of expanding the liner. This liner is inserted in a pipe joint in a manner similar to liner 10, and it is expanded by an expanding tool having ends 21 small enough to pass through the joint in the pipe ends and enter the openings 26 and 27 in the liner. By bringing the handles of the expanding tool together the liner is expanded in a manner similar to that shown in Fig. 1.

It is understood, of course, that the various component parts of the liner may be altered in form to meet various conditions of service, and be assembled in different relative positions from that shown to meet specific requirements. Also, equivalent materials may be substituted for those described. These and other variations and substitutions may be made without departing from the invention or sacrificing any of the rights thereunder.

I claim:

1. A liner for use in making a welded joint between the opposed ends of two metal pipe sections comprising a split ring of metal adapted to be expanded against the inner surface of said ends over said joint, and when so expanded having a lateral portion supporting each of said ends and a depressed central portion spaced inward from said joint; a lug attached near each end of said liner and extending outward therefrom through said joint for expanding said liner; and one or more studs attached to said liner and extending outward therefrom through said joint to hold the ends of said pipe in a spaced relation suitable for welding.

2. A liner for use in making a welded joint between the opposed ends of two metal pipe sections comprising a split ring of metal adapted to be expanded against the inner surface of said ends over said joint, and when so expanded having a lateral portion in contact with each of said ends and a central depression spaced inward from said joint; the outer surface of both said lateral portions and said depression being curved inward transversely with the curve of said depression more abrupt than that of said lateral portions; means for expanding said liner against the inside of said ends; and means for holding said ends in a spaced relation suitable for welding.

3. A liner for use in making a welded joint between the abutting ends of two metal pipe sections comprising a split ring of metal adapted to be expanded against the inner surface of said ends over said joint, and when so expanded having a lateral portion in contact with each of said ends and a central portion spaced inward from said joint; said liner being curved inward transversely; means for expanding said liner against the inside of said ends; and means for holding said ends in a spaced relation suitable for welding.

4. A liner for use in making a welded joint between the abutting ends of two metal pipe sections comprising a split ring of metal adapted to be expanded against the inner surface of said ends over said joint, and when so expanded having a lateral portion supporting each of said ends and a depressed central portion spaced inward from said joint; the inner surface of said liner being curved inward transversely; means for expanding said liner against the inside of said ends; and means for holding said ends in a spaced relation suitable for welding.

5. A liner for use in making a welded joint between the abutting ends of two metal pipe sections comprising a split ring of metal adapted to be expanded against the inner surface of said ends over said joint, and when so expanded having a lateral portion supporting each of said ends and a depressed central portion spaced inward from said joint; said lateral portions being curved outward transversely, and said central portion being curved inward transversely; means for expanding said liner against the inside of said ends; and means for holding said ends in a spaced relation suitable for welding.

6. A liner for use in making a welded joint between the abutting ends of two metal pipe sections comprising a split ring of metal adapted to be expanded against the inner surface of said ends over said joint, and when so expanded having a lateral portion in contact with each of said ends and a central depression spaced inward from said joint; the outer surface of both said lateral portions and said depression being curved inward transversely with the curve of said depression more abrupt than that of said lateral portions; the inner surface of said liner being curved inward transversely to reduce its resistance to fluid flow through said pipe; means for expanding said liner against the inside of said ends; and means for holding said ends in a spaced relation suitable for welding.

7. A liner for use in making a welded joint between the abutting ends of two metal pipe sections comprising a split ring of metal adapted to be expanded against the inner surface of said ends over said joint; a lug attached near each end of said liner and extending outward therefrom through said joint for expanding said liner; and one or more studs attached to said liner and extending outward therefrom through said joint to hold the ends of said pipe in a spaced relation suitable for welding; said lugs being somewhat thicker than said studs to prevents the abutting ends of the pipe from gripping the studs and interfering with their movement during the operation of expanding the liner.

8. A liner for use in making a welded joint between the abutting ends of two metal pipe sections comprising a split ring of metal adapted to be expanded against the inner surface of said ends over said joint; a lug attached near each end of said liner and extending outward therefrom through said joint for expanding said liner; and a slot in one end of said liner adapted to fit around the lug on the other end thereof to hold the ends of the contracted liner in alignment during shipment and during the operation of inserting it in a pipe joint.

9. A liner for use in making a welded joint between the abutting ends of two metal pipe sections comprising a split ring of metal adapted to be expanded against the inner surface of said ends over said joint; and a lug attached near each end of said liner and extending outward therefrom through said joint for expanding said liner; said lugs having projections at the outer end thereof which face each other and hold the expanding device in place during the operation of expanding the liner.

10. A liner for use in making a welded joint between the abutting ends of two metal pipe sections comprising a split ring of metal adapted to be expanded against the inner surface of said ends over said joint; a lug attached near each end of said liner and extending outward therefrom through said joint for expanding said liner; one of said lugs being located nearer the end of the liner than the other; and one end of said liner having a slot therein adapted to fit around the lug in the other end to hold the ends of the contracted liner in alignment during the operation of inserting it in a pipe joint.

11. A liner for use in making a welded joint between the abutting ends of two metal pipe sections comprising a split ring of metal adapted to be expanded against the inner surface of said ends over said joint, and when so expanded having a lateral portion in contact with each of said ends and a central portion spaced inward from said joint; means for expanding said liner against the inside of said ends; and means for holding said ends in a spaced relation suitable for welding.

12. A liner for use in making a welded joint between the opposed ends of two metal pipe sections comprising a split ring of metal adapted to be expanded against the inner surface of said ends over said joint, and when so expanded having a lateral portion supporting each of said ends and a depressed central portion spaced inward from said joint; a lug attached near each end of said liner and extending outward therefrom through said joint for expanding said liner; and one or more studs attached to said liner and extending outward therefrom through said joint to hold the ends of said pipe in a spaced relation suitable for welding, and an outer surface transversely curved from one circumferential edge to the other so as to present a concave face to the inner sides of the pipe sections.

13. A liner for use in making a welded joint between the opposed ends of two metal pipe sections comprising a split ring of metal adapted to be expanded against the inner surface of said ends over said joint, and when so expanded having a lateral portion supporting each of said ends and a depressed central portion spaced inward from said joint; a lug attached near each end of said liner and extending outward therefrom through said joint for expanding said liner; and one or more studs attached to said liner and extending outward therefrom through said joint to hold the ends of said pipe in a spaced relation suitable for welding, and studs located at intervals along and extending outwardly from the outer surface of the ring so as to maintain said opposed ends in substantially uniform spaced relation for welding.

14. A liner for use in making a welded joint between the abutting ends of two metal pipe sections comprising a split ring of metal adapted to be expanded against the inner surface of said ends over said joint, and when so expanded having a lateral portion in contact with each of said ends and a central portion spaced inward from said joint; said liner being curved inward transversely; means for expanding said liner against the inside of said ends; and means for holding said ends in a spaced relation suitable for welding, an outer surface transversely curved from one circumferential edge to the other so as to present a concave face to the inner sides of said sections, and studs located at intervals along and extending outwardly from the outer surface of the ring so as to maintain said opposed ends in substantially uniform spaced relation for welding.

15. The combination with pipe sections arranged end to end, of a joint uniting said sections comprising a metal ring inserted against the inside of the pipe sections overlapping the opposed ends of the latter, said ring having its inner surface curved transversely from one circumferential edge to the other, whereby a Venturi-shaped construction is provided across the joint, said ring and the ends of the pipe sections being welded together.

16. A welded joint between abutting ends of adjacent metal pipe sections comprising a flexible metal ring positioned against the inside of the pipe sections overlapping the opposed ends of the latter, said ring having an inwardly bowed surface extending from one of its circumferential edge portions to the other, and a weld metal section joining the ends of said pipe sections and said ring.

THOMAS W. GREENE.